June 22, 1965  S. J. GARTNER  3,190,462
TRANSFER MECHANISM FOR ASSEMBLING APPARATUS AND METHODS
Original Filed Jan. 29, 1954  7 Sheets-Sheet 2

INVENTOR.
STANLEY J. GARTNER
BY
ATTORNEYS

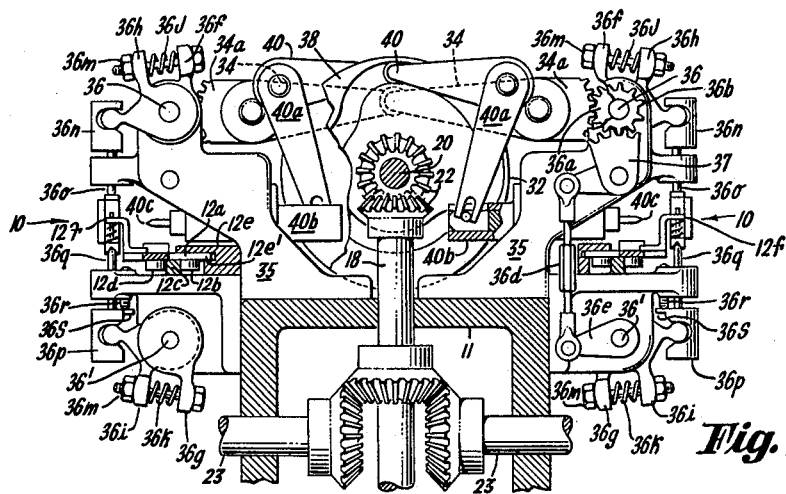
Fig. 2
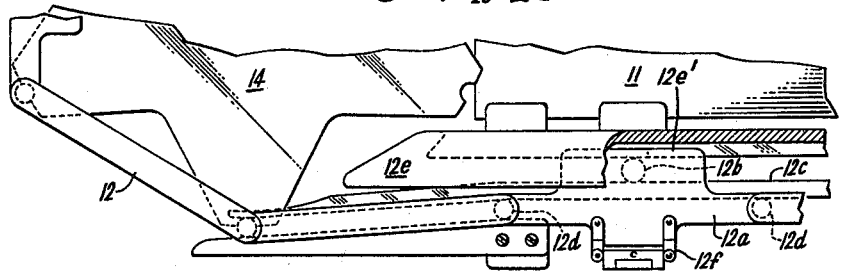
Fig. 2A
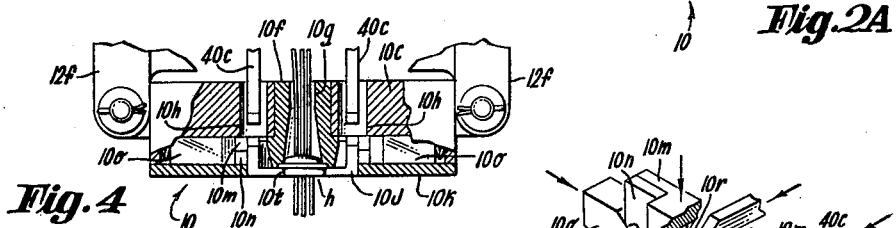
Fig. 4
Fig. 5
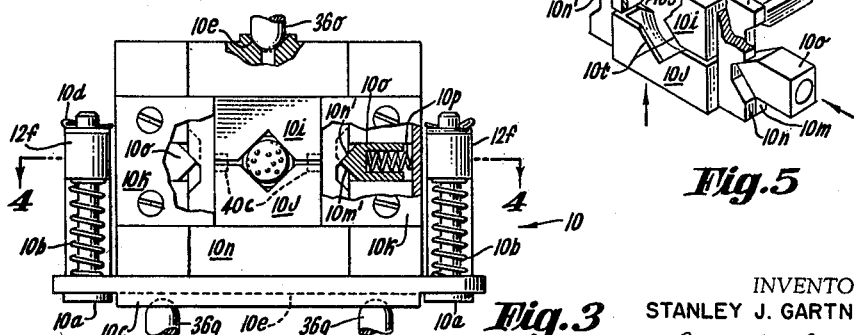
Fig. 3
INVENTOR.
STANLEY J. GARTNER
BY
ATTORNEYS

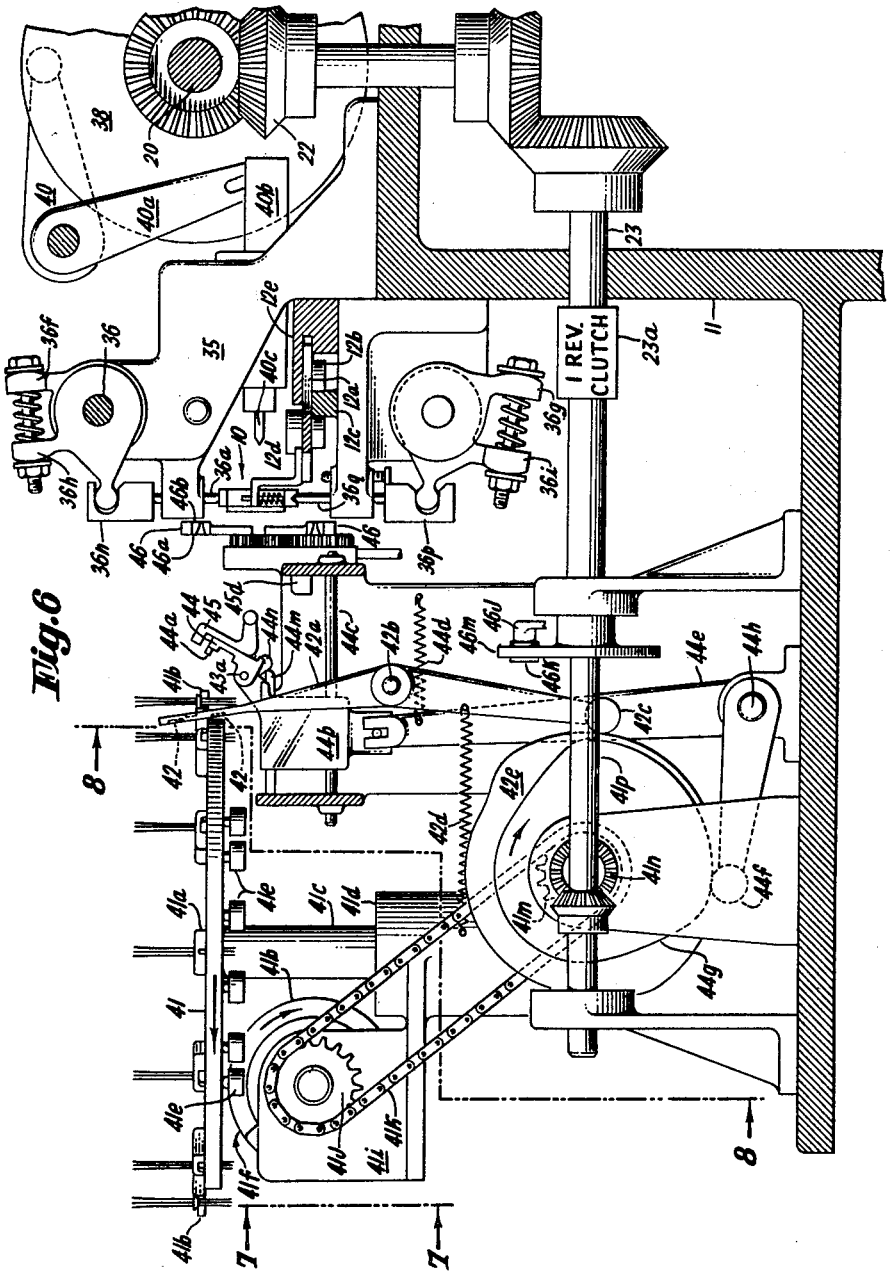

June 22, 1965  S. J. GARTNER  3,190,462
TRANSFER MECHANISM FOR ASSEMBLING APPARATUS AND METHODS
Original Filed Jan. 29, 1954  7 Sheets-Sheet 5
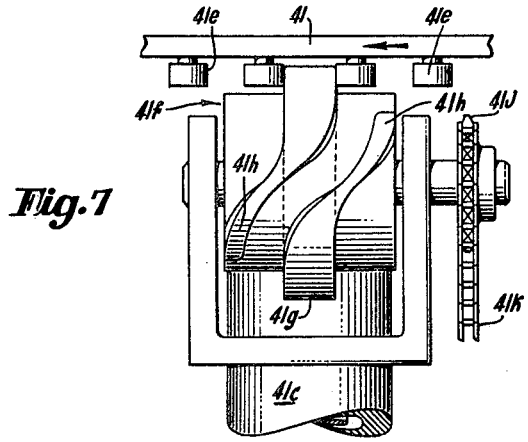
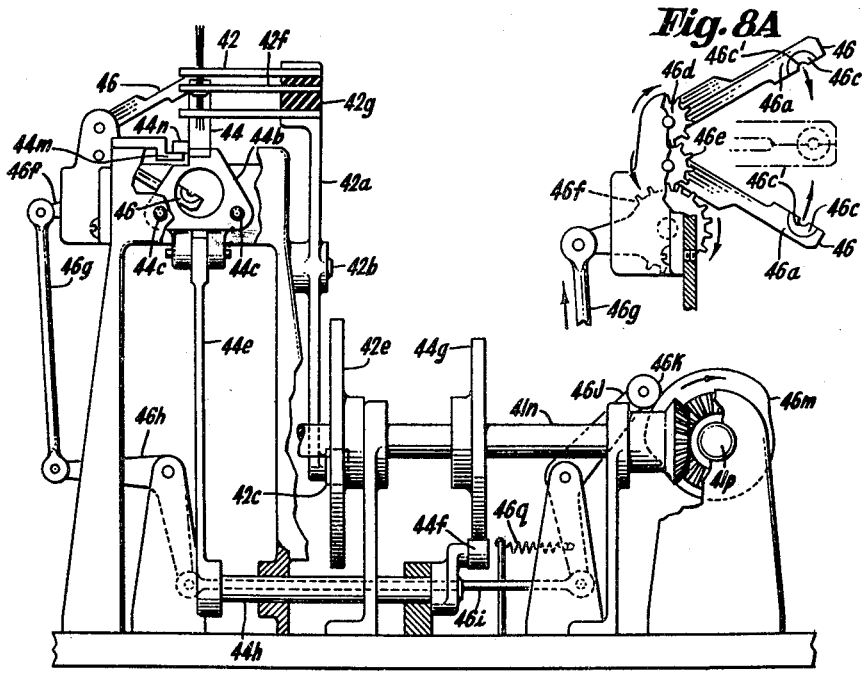
INVENTOR.
STANLEY J. GARTNER
BY
ATTORNEYS

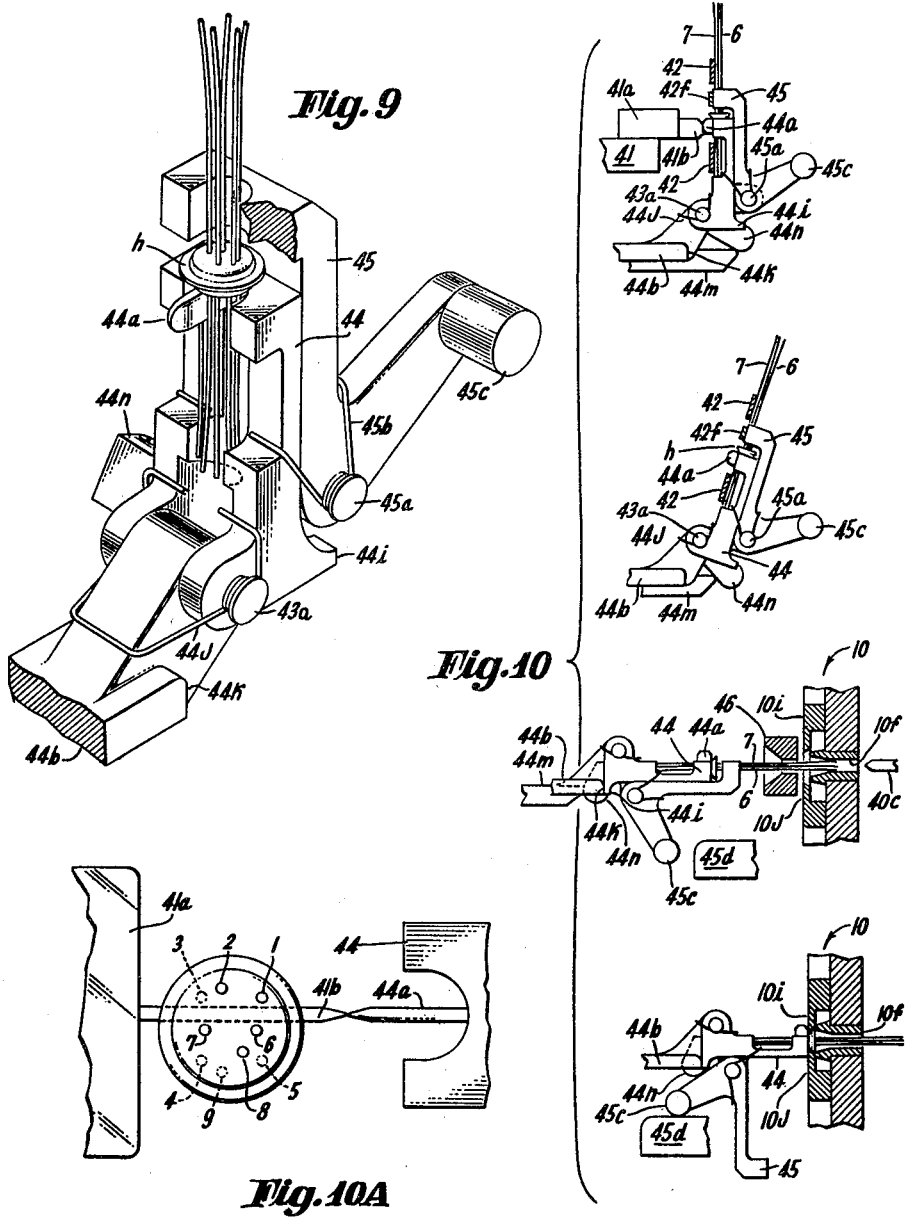

United States Patent Office

3,190,462
Patented June 22, 1965

3,190,462
TRANSFER MECHANISM FOR ASSEMBLING
APPARATUS AND METHODS
Stanley J. Gartner, Emporium, Pa., assignor, by mesne
assignments, to Sylvania Electric Products Inc., Wilmington, Del., a corporation of Delaware
Application Feb. 7, 1962, Ser. No. 171,745, which is a
division of application Ser. No. 406,930, Jan. 29, 1954,
now Patent No. 3,069,749, dated Dec. 25, 1962.
Divided and this application Sept. 19, 1963, Ser. No.
310,046
11 Claims. (Cl. 214—1)

The present invention relates generally to transfer mechanisms used in connection with methods and apparatus for automatically assembling parts, particularly the component parts of a mount or electrode assembly of an electronic tube or the like. This application is a division of application Serial No. 171,745 filed Febraury 7, 1962, which is a division of application Serial No. 406,930, now U.S. Patent No. 3,069,749 of December 25, 1962.

During the several decades of technical development and commercial exploitation of vacuum tubes and the like there has been a presistent need for improved methods of assembly and for automatic assembling apparatus for the electrodes of such devices. Some early machines were devised that were adapted to assemble simple types of mounts but even these were unsuccessful to my knowledge.

For many years, tubes have included many electrodes, and with the development of the hearing aid and the proximity fuse, the dimensions of many types of tubes have been greatly reduced. It will be recognized that as mounts are made progressively smaller, manual assembly without deforming the delicate electrodes becomes progressively more difficult. In the event that a mount is assembled imperfectly, perhaps including a deformed electrode, the defective nature of the mount may not be detected until after the mount is sealed in its envelope as finally exhausted and completed. At this stage, it is revealed as defective after it represents a far greater expenditure than is represented by the mount itself. In other words, manual assembly techniques tend to deform the electrodes in such a way that defective mounts are often detected after the tube constructed has advanced to an expensive stage. The methods and apparatus provided by the present invention vastly reduce this tendency to deform electrodes; and any deformation produced occasionally is so prominent as to be immediately detected and the mount can be rejected while still representing comparatively small cost.

It is accordingly an important object of the present invention to provide new and improved methods and apparatus for automatically assembling electronic tube mounts and the like. A further object is to automatically assemble electrodes of even small and complicated mounts in rapid, precise and automatic routine.

In the illustrative embodiment of the invention detailed below, the electrodes are assembled in proper mutual relationship. The mount as finished in the disclosed embodiment includes a "stem" on which the electrode assembly is supported, the stem consisting of a glass button or header through which are sealed a set of wires. These serve as terminal connectors and mechanical supports of the electrodes later assembled on the wires. The header usually serves as the end of a tube envelope.

Stems are ordinarily prepared in molding machines which locate the wires in the glass header with relatively broad tolerance. A feature of the present invention is in the "tailoring" or trimming of the leads to accurately determine lengths; and a further feature is in the adjustment of the lead positions to close tolerance, for consistent and reliable operation of the assembling machine and further to assure consistent, accurate duplication of the automatically assembled mounts. In accomplishing this purpose, the machine handles the stems and is effective to adjust the way in which the stems are held so as to perfect the positioning of the wires; and that effect is further enhanced by devices which trim certain of the wires to critical lengths spaced from the glass portion and to bend certain of the wires, where necessary, into the optimum pattern on which the remainder of the operations depend.

The machine includes a conveyor which carries a number of work holders from each of a series of stations to the next, step-wise. Because of the small dimensions of the illustrative mount being assembled and the consequent close tolerances involved, it is important that the conveyor should consistently advance the work holders to an accurate position in each station. Ordinary conveyor mechanisms, such as the usual chain conveyor, tend to introduce slack and in this way tend to defeat the objective of accurate transport of the work holders. A feature of this invention resides in a conveyor having unusually large links, and correspondingly, having relatively few links. A subsidiary feature relates to the conveyor that is disposed about a pair of sprockets, one of which is movable to and from the other so as to accommodate the travel of the large links about those sprockets. The use of an odd number of links minimizes the motion of the movable sprocket, and the consequent impacts on the frame and in the drive are minimized.

In the illustrative machine, the previously molded glass-and-wire stems are loaded manually onto a conveyor plate with rough preliminary orientation. A feature of the invention resides in the techniques and mechanisms for handling the glass-and-wire stem during its transfer from the initial feed plate to the work holders of the main conveyor, so as to preserve and improve the initial orientation and to effect this transfer in a simple manner well suited to specialized forms of stems.

The completed mount in this illustrative disclosure involves parallel insulated discs, customarily of pierced mica, which fix the spacing between the electrodes precisely. As previously mentioned, the wires of the stem are adjusted in the machine, into an accurate pattern. In this illustrative machine an important feature is in the provision of a piercing die for forming the holes in the mica while each mica is held in the very element utilized to transfer and apply the mica to stem wires, and in the case of the top mica, to certain of the electrodes.

That portion of the machine which locates the stem in the work-holder and trims the wires to critical lengths constitutes a useful combination; but if the machine accomplished no more, it might well be considered uneconomical. Ordinarily, stems are manually inserted into a trimming die. An important feature of this invention is in not merely trimming the stem leads, but accomplishing the further mount-assembly operations on the stem as trimmed and oriented in the trimming operation. The consistent orientation of the stems and the consistent trimming of the leads at a uniform distance from the workholder establishes a uniform condition of the stem utilized in assembly of the additional parts, with consistent accuracy and success.

The first mica to be assembled has an accurate pattern of pierced holes. Certain stem wires enter certain of the pierced holes in the mica where the mica is assembled to the stem. Those wires are then engaged and utilized in subsequent assembling operations, to pick up and accurately locate the mica so that electrodes may automatically be assembled to the mica, with portions of those electrodes extending through additional pierced holes in the mica. The mica is oriented indirectly.

A further feature of the present invention resides in the insertion of the side rods of the usual helically wound grid into holes pierced in a mica after the mica is on the stem wires. This is accomplished by applying the mica to the stem wires at an intermediate position, by supplying and to supply thrust-resisting backing for the mica while inserting the grid, and finally by pushing the gird and mica all the way to the short wires on the stem. A further feature resides in the welding of a grid stop to one of the grid side rods so as to prevent appreciable shifting of the grid in the completed tube, and to accomplish this despite extremely small dimensions involved in the illustrative mount to which the invention is applied. This is accomplished when the mica is at an intermediate position (such that both sides of the mica are easily accessible) and after grid insertion. The stop is applied to the grid side rod with the mica in this position, and thereafter the mica and grid subassembly is advanced to its final position on the stem wires. The welding tools serve not only to weld, but to transport the grid stop to position and to furnish thrust resistance behind the mica during insertion of the grid.

A further feature of the invention resides in the assembly of a second grid telescopically about the first while the first mica is in the intermediate position and with the side rods of the second grid penetrating the prepared holes in the mica, and thereafter advancing the subassembly of two grids and the mica to the final position on the wires of the stem.

In the illustrative disclosure, it will be seen that the two grids function with two long stem wires as electrodes of a pentode; and a two-part anode in the form of two preformed anode plates is automatically assembled to the mount thus far completed.

In this machine, a second mica is applied to the projecting ends of the electrodes opposite the first mica; and a further part is assembled to the mount to lock the mica in place and to interconnect the parts of a two-part anode. One of those electrodes that penetrates the top mica is seized and oriented for indirectly orienting the top mica in this assembling operation, a feature that is found in another form in the grid-mounting stations.

A desirable minimum number of welding operations is effected for permanently retaining the assembly of the electrodes and other parts in the initial accurate configuration produced by the uniformly repeated operations of the machine.

Included in several stations are various important forms of tools which, like the gathering tools in the cutting station, embrace the parts of the partial mount while a further component is advanced into place. An especially useful and novel form of gathering tool used in combination with assembling mechanisms in several of the stations involves jaws which close on each other and, when closed, present a pattern of apertures with flared openings facing the stem holder. They advance on and receive the stem wires, and having established orientation desired for an assembly operation, are laterally separated and withdrawn. Certain split tools have flared openings facing toward the stem and flared openings facing away from the stem. These advance on the stem to receive and orient a pattern of wires while also acting to direct a further part, such as a grid or an anode part, in a precise path toward the partial mount. These and further detailed yet important features of the invention will be better appreciated from the specific description of the various tools involved.

In the event of misoperation, it may happen that a mount is deformed by the apparatus. Such deformed mount is prominently defective and is readily detected upon inspection and rejected as it emerges from the machine, long before it can reach the envelope sealing and evacuating stage of manufacture of electron tubes. This is a valuable aspect of the invention. The mount as it emerges at the assembling stage of tube manufacture can be rejected at low cost if it should be found defective. In contrast, manually assembled mounts with no prominent visual defect are assembled into completed, sealed and exhausted tubes, and at this completed stage there is a very substantial rate of rejection. The rate of rejection of completed tubes containing mounts prepared under the present invention is sharply reduced.

Further features of novelty will be appreciated from the illustrative disclosure that follows. It will naturally be understood that certain aspects and features of the described embodiment may be omitted as required and that certain features are useful in other combinations. However, the entire organization is admirably adapted to achieve the broad purpose of assembling and uniting the electrodes of a mount, particularly in assembling numerous electrodes of a subminiature mount. In the detailed disclosure, reference is made to the accompanying drawings forming part of the present disclosure. In the drawings:

FIG. 2 is an elevation in cross-section along the line 2—2 of FIG. 1 but at larger scale, showing the jaw-opening mechanisms for the stem blocks or work holders and the drive mechanism of the several stations of the machines;

FIG. 2A is a portion of FIG. 1A at larger scale showing details of the link conveyor for the stem block and the guide mechanisms for maintaining the stem block along a predetermined path during travel through successive stations;

FIG. 3 is an enlarged fragmentary elevation, with parts broken away and sectioned, showing the details of the work holder or stem block;

FIG. 4 is a sectional view taken substantially along the line 4—4 of FIG. 3 and looking in the direction of the arrows;

FIG. 5 is a perspective view, with parts broken away, of the stem block illustrated in FIGS. 3 and 4;

FIG. 6 is an elevation, certain parts sectioned and broken away, showing portions of the mechanism of FIG. 1A together with the stem-loading mechanism at Station A of FIG. 1A;

FIG. 7 is an enlarged fragmentary elevation, viewed generally from the line 7—7 of FIG. 6 and looking in the direction of the arrows, showing the turret indexing mechanism;

FIG. 8 is an elevation, with some parts broken away and shown in section, taken substantially along the line 8—8 of FIG. 6 and looking in the direction of the arrows, showing the details of transfer fingers for displacing successive stems from the feed turret onto a two part transfer member;

FIG. 8A is an elevation showing the details of a split funnel guide interposed between the transfer member and the stem block in FIG. 6;

FIG. 9 is a perspective view showing the details of the two part transfer member of FIG. 6 with a stem loaded therein ready for transfer;

FIG. 10 is a four stage progressive illustration of the transfer member of FIG. 6 in successive positions of movement from receiving a stem at the feed turret to delivering the stem through the split guide to the stem block;

FIG. 10A is an enlarged fragmentary plan view showing a stem on the feed turret together with part of the transfer member, as viewed just prior to the first diagrammatic showing of FIG. 10;

Figure 1A:
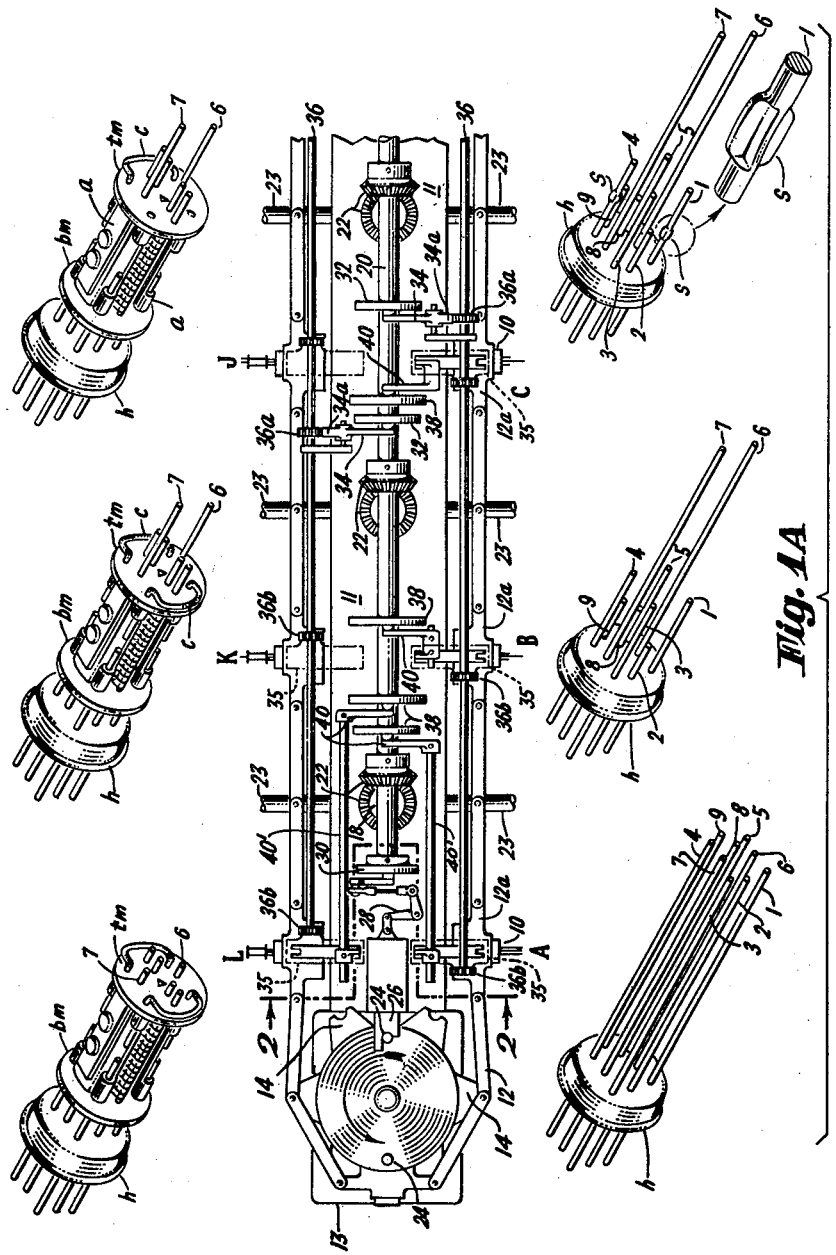
FIGS. 1A and 1B are a plan view of an illustrative mount machine embodying features of the present invention, including the work conveyor and portions of the coordinating drive and cam mechanisms of the various work stations, showing in greatly enlarged perspective the progress of a typical mount during passage through the several work stations of the machine but omitting those stations.
Figure 1B:
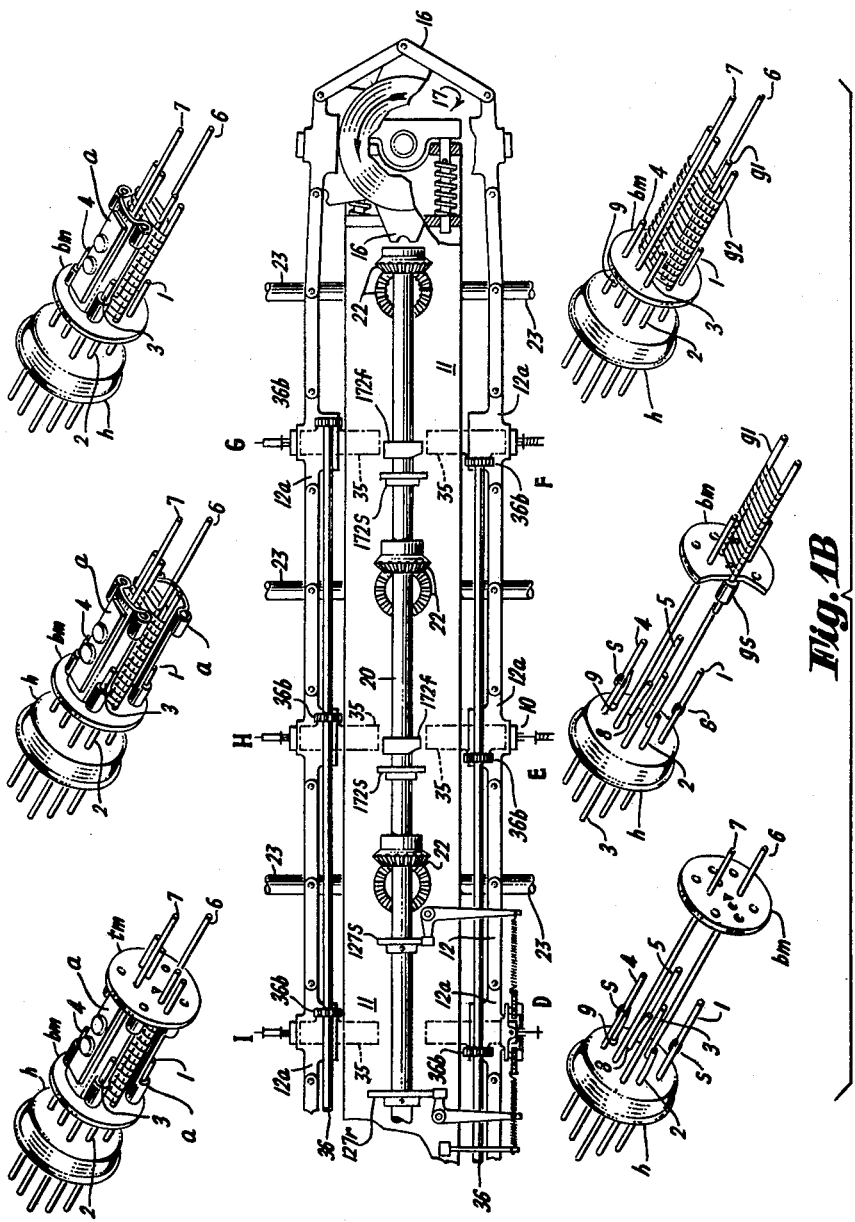

In FIGS. 1A and 1B there is shown the plan view of a conveyor 12 and associated operating mechanisms for assembling a number of electrodes to a stem made up of wires sealed in a glass header $h$. The assembly of the electrodes and the stem is termed a "mount" in the art. Such an assembly may be of various sizes, and the principles here involved will be recognized as applicable to a wide range of designs of mounts and the like. However, the present machine is particularly adapted, by the solution of numerous special problems, to the assembly of mounts of extremely small proportions. The tube used in this illustrative embodiment is a pentode having a two-part anode, a wire or rod suppressor, a screen grid, and a control grid, all of which extend parallel to the length of the tube and are fixed in relative spacing each from the others by an insulating wafer at each end of the electrode assemblies, usually of mica. The particular tube is intended to receive a filamentary cathode that is manually added to the mount after the mount is delivered by this assembling machine. The diameter of the tube being fabricated is the so-called "T-3" size, that is, approximately $3/8"$ outside diameter of the glass enclosing envelope.

The tube is assembled by commencing with a stem or header that is loaded into a conveyor and is transported step-wise past a series of operating stations A to L inclusive where the header wires are either shaped by cutting and swaging or where one or more of the electrodes and the micas are assembled or welded to produce the completed mount. The extremely small dimensions of the mount being assembled represent a controlling consideration throughout the machine. Thus, the machine itself forms certain of the mount parts in accurate configuration so that the part will be in perfect orientation for assembling and so that, when the sub-assembly leaving one station reacehs a succeeding station, the various parts of the sub-assembly will be in accurate position and relative arrangement for the operation at the succeeding station.

In FIG. 1A three stations, A, B, and C are seen where a stem block 10 on the linked conveyor 12 comes to rest successively. At the first station A, glass header $h$ having sealed wires 1 to 9 inclusive, is mechanically loaded on the conveyor in proper position for the further operations in the succeeding stations B and C. Wires 1, 2, 3, 4 . . . 8, 9, extend from the wafer header $h$ in particular positions appropriate for succeeding operations which are effected at further stations during the travel of the conveyor between the stem-loading and unloading positions A and L.

By loading the stem into the machine with the wires 1 to 9 inclusive of equal length and longer than the longest wire needed, it becomes possible to trim the wires to lengths required during further assembly operations, all accurately in relation to a common reference, namely, the wafer header $h$. In the final part of the conveyor's traverse, there is seen a mount completed by this machine. This includes a bottom mica $bm$ spaced accurately from the header $h$. The location of the bottom mica $bm$ is established partly by the wires 2, 8 and 9 cut short and having their ends defining a plane against which the bottom mica is pressed. Additionally, leads 1 and 4 (which extend through the bottom mica $bm$ for connection to the two anode plates) have swaged abutments at the plane of cut leads 2, 8 and 9 for supporting the bottom mica $bm$.

By loading an uncut and unswaged stem into the stem loading station A, it becomes possible to cut certain leads to critical lengths at a further station, and at a still further station to swage accurately located shoulders on certain leads, thereby defining the bottom mica plane. This may be accomplished with the assurance that, although the trimming and swaging are effected at different stations, the operations are consistently related to each other by the accurate orientation of the stem at each of the stations, both as to the end-wise positioning of the wire and as to the wire pattern presented at each station to the operating tools.

Wires 6 and 7 ultimately serve as suppressor electrodes, and are also utilized to support and connect the filamentary cathode. At the cutting or trimming station B, leads 6 and 7 remain uncut and are of the same full length as when received in the stem loading station A; but two other sets of leads are trimmed to different lengths, specifically leads 2, 8, and 9, are trimmed to very short lengths equal to the spacing between the glass header $h$ and the bottom mica $bm$, and leads 1, 3, 4 and 5 disposed in an approximately square pattern, are trimmed to a medium length such as to penetrate the bottom mica $bm$ and extend part way toward the top mica $tm$.

In station C, two of the medium length leads namely 1 and 4, are swaged to provide a shoulder or abutment at the same separation from the header $h$ as the ends of wires 2, 8, and 9. The position of the swaged shoulders S and the cut ends of the wires 2, 8, 9 are all of a high order of accuracy because of the accurate grip of header $h$ in a stem holder and the holder is located precisely at each station in the machine. It is an important feature that the header $h$ is seated in its holder and is maintained in a very definite fixed plane in its traverse through the machine from station to station, and further that each of the wires, 1 to 9 inclusive, remains in a very accurately established position endwise and transversely. It will be seen that in some of the stations the accuracy of the positioning of these wires and their pattern is reestablished and carefully readjusted.

It will be understood that the header $h$ as formed in a stem molding machine carries the wires 1 to 9 in a pattern whose accuracy and consistency is limited, considering the requirement of stem molding dies that the wires should be loosely received; and because automatic assembling of a mount must not be impeded by variations in the pattern or distribution of the wires, stations A, B and C of the present machines are adapted to receive wire patterns of coarse tolerance and adjust the pattern of wires to close tolerance, before other parts are assembled.

In station D, the bottom mica $bm$ is applied to wires 6 and 7 and pushed part way down the lengths of these wires but not to the final position where it is pierced by medium length wires 1, 3, 4 and 5 and rests against the ends of short wires 2, 8 and 9, and the swaged shoulders S of the wires 1 and 4.

At the bottom mica-applying station D (see FIG. 1B) an important principle of the machine is utilized further and again illustrated. The accurately oriented wires whose positions are fixed in the stem-loading station A and adjusted in both the cutting and swaging stations B and C are to receive a bottom mica having a pattern of holes. The machine itself forms the holes immediately prior to application of the bottom mica to the wires. Thus the holes which are to be penetrated by the uncut reference wires 6 and 7 are in the proper positions and relative spacing to assure that the bottom mica $bm$ can be mechanically thrust against the wire ends, in alignment with the corresponding holes. The remainder of the holes are accurately distributed to receive the medium length wires 1, 3, 4 and 5 that were correspondingly accurately adjusted in the previous stations B and C. These wires penetrate mica $bm$ at a later station when mica $bm$ is pressed against stops provided by the ends of short leads 2, 8, and 9.

At this station D a further mechanism is included for shifting the short wires to definite positions, when necessary, so that such wires will assuredly not obstruct the side rods of grids that are later inserted.

In the next station E (which the bottom mica $bm$ supported in its intermediate position along the uncut reference wires 6 and 7) a grid $g1$ is inserted into two of the holes of the bottom mica which are properly located for receiving the grid side rods. This is effected by accurate orientation of the wires 6 and 7, which act in turn to carry the pierced bottom mica into accurate position for receiving those side rods. Since the bottom mica $bm$ is perforated in the machine, specifically at the station D, no precaution is required to prevent inversion of the hole pattern such as might occur if the bottom mica were formed separately and subsequently loaded into this assembling machine. Thereafter, at station E, a metal sleeve, or grid stop $gs$ is formed in the machine and applied to the end of a side rod of grid $g1$ that projects through the bottom mica, to hold the grid $g1$ firmly against the bottom mica $bm$. This grid stop is welded to one of the side rods of the grid $g1$ at the underside of the bottom mica $bm$. The sleeve $gs$ is extremely tiny, when it is borne in mind that the bottom mica $bm$ is of the order of ¼" in diameter. The grid stop is not handled as a separate part but is cut, formed, applied, and welded, entirely within station E. The spacing provided between header $h$ and the bottom mica $bm$ in its preliminary position facilitates the assembling and welding operations. Later, when the bottom mica $bm$ is advanced to its final position, there is little clearance for application of welding tools.

The other side rod of grid $g1$, extending through the bottom mica $bm$, ultimately is disposed close to short wire 9 which terminates at the lower face of the bottom mica $bm$; and in a welding step expediently effected manually, that side rod is joined to wire 9 which constitutes the lead conductor for the #1 grid in the finished, sealed tube.

At the next station F, a second grid $g2$ is mounted coaxially of and around $g1$ and the side rods of the grid $g2$ are forced through the accurately located holes in bottom mica $bm$; and then the subassembly of grids $g1$ and $g2$ and bottom mica are advanced to their final position with the bottom mica in the assembly plane defined by short wires 2, 8 and 9, and abutting against the swaged portions S of medium length leads 1 and 4.

In the grid-applying stations E and F the bottom mica $bm$ is in its intermediate position during the insertion of each of the grids $g1$ and $g2$. After the grids have been inserted, the bottom mica $bm$ is finally seated. In the next following stations G and H two portions of a two-part anode may be successively thrust into position on opposite sides of the grids $g1$, $g2$ and against the accurately located bottom mica. The two part anode includes a front part $a$ on leads 3 and 4, and a second part $a$ on leads 1 and 5.

In station I a top mica $tm$ is pierced and applied to the long wires 6 and 7 as was the bottom mica $bm$ in station D. In the following stations J and K, wire straps or "hairpins" are formed and inserted for interconnecting the two parts $a$ of the anode, and to hold the top mica $tm$ in place against the top edges of the anode parts. Finally, in the station L of the machine, the excessively long, previously uncut reference wires 6 and 7 are trimmed to a desired length, and the assembled mount is unloaded from the machine.

A further principle will be seen, applied repeatedly in various stations of the machine. In loading the stem into the stem blocks at the station A, the relatively fixed pattern of wires at the locations where they emerge from header $h$ is used as a reference. In stations B and C where the wires are cut and swaged, and in the other stations where the uncut or "long" wires and electrode side rods are held, the possibility exists that any of those long wires or the electrode side rods may be deflected from the reliable pattern defined by the wires closely adjacent the header and/or by the bottom and top micas $bm$ and $tm$. In stations B, C, and D, the long and slender wires extend to unreliable positions at their free ends. The apparatus engages the wires close to the header where the wire pattern may be relied on, and a combing pattern of tool apertures is formed and then moved perpendicularly away from the header $h$ to the position where the cutting die, the swaging die, or the mica-applying head is to engage the previously unsupported and unreliably positioned wire ends. These cutting, swaging and assembling tools then advance along the wires toward the header in a reverse stroke, to reach their final working positions.

The novel step-wise conveyor shown in FIGS. 1A and 1B should be properly appreciated, since it is very important to the operation of the mechanism at the several work stations from the stem loading station A to the final trimming and unloading station L. In one respect it might be ideal if the several stem blocks 10 which hold the individual stems at spaces equal to the spaces between the various work stations were part of one rigid disc or turret. In that event, their relative spacings might conceivably be rigidly and invariably fixed. The location of the work mechanisms would then require most remarkable precision, and thermal dimension changes would require special accommodation. In contrast, stem blocks 10 are carried by a link conveyor in the machine described, in a semi-floating condition so that they can be accurately located in each station by mechanism at that station, and to use a linked conveyor, sprocket-supported at its opposite extremities. This concept is applied in my copending application Ser. No. 790,570 filed Dec. 9, 1947, now abandoned. It is of special advantage that a minimum number of strong large links should be used. This minimizes stretching of the links and minimizes the total effects on the conveyor of the looseness and wear at individual pivots, contrasting in this respect from conventional chain conveyors.

Where large links are used, that are wrapped around a pair of spaced drive and guide sprockets, provision should be made for the sprocket shafts to move toward and away from each other as each large link approaches a sprocket, swings around the sprocket, and then leaves. This motion should be minimized to avoid excessive stresses on the conveyor with resulting unreliable positioning of the work holders in the work stations. This sprocket motion is minimized by using an odd number of large links, to insure the presence of one link at only one sprocket, that extends across the line of the two sprocket shafts, while at the opposite sprocket a pair of links form a V-configuration. This condition of a "flat" link at one end and V links at the other changes as the conveyor advances with this V first at one sprocket and then at the other. The arrangement promotes smooth conveyor operation. Because of the large size of the individual links, one of the sprockets is mounted with a yielding bearing permitting sliding movement toward and away from the opposite fixed-shaft sprocket. If a flat link were to pass around a sprocket at one end and a corresponding flat link were to pass around a sprocket at the opposite end, followed by the V-joint between the two links being disposed at one end of the conveyor and a corresponding V-joint at the opposite sprocket, then the yieldably supported sprocket would "bounce" excessively, perhaps to a damaging degree. Also, vibrations would be produced which are undesirable especially in a delicate assembly operation as is here involved.

Accordingly, conveyor 12 is made of an odd number of links, forty-five in the present case, each third link 12a bearing a stem block 10. There are twelve work stations in the machine, with one stem block 10 at each station and with three additional stem blocks in transit around the end sprockets 14 and 16. The end sprocket 16 has a suitable bearing 17 that is horizontally slidable to and from the end sprocket 14, and is spring biased away from sprocket 14, for tensioning the conveyor 12. The conveyor 12 advances stepwise around bed 11. A main drive shaft 18 driven from a motor (not shown) is provided which furnishes power to a suitable intermittent rotary drive transmission 13 (see FIG. 1) effective for indexing sprocket 14 180° at a time followed by idle intervals. A specially desirable form of such intermittent drive transmission 13 for the machine is disclosed in my copending application Ser. No. 294,902 filed June 21, 1952, now Patent No. 2,740,301. Since sprocket 14 has six radial sprocket teeth spaced one conveyor link apart, the conveyor advances three links, identified with one stem block, for each advance of sprocket 14. Main drive shaft 18 is geared to continuously rotate horizontal cam shaft 20 continuously and thereby operate a series of control cams to be described, and main drive shaft 18 is also coupled via gearing 22 to rotate a series of vertical drive shafts for furnishing continuous synchronised rotary power for shafts 23 at the various work stations spaced along the conveyor.

Sprocket 14 has a pair of pins 24 which are engaged by a locking detent 26 (see FIG. 1A) for arresting and locating the conveyor in the intervals when the various stem blocks are disposed opposite the several work stations. During sprocket indexing motions, detent 26 is withdrawn by a linkage 28 of any convenient design operated by a cam 30 on continuously rotating cam shaft 20.

The drive mechanism in FIGS. 1A and 1B includes a further pair of cams 32 on cam shaft 20 (see FIG. 2) for rocking levers 34 which, through segmental gears 34a and pinions 36a, cause rock shafts 36 to oscillate. These rock shafts extend along all the work stations. Their purpose is to operate the clamping mechanisms, to be described, for arresting and accurately locating the stem blocks 12 in the several work stations. Additionally, continuously rotating cam shaft 20 furnishes power for mechanically opening the various stem blocks 12 at certain times in the sequence of operations. For this purpose, cam shaft 20 carries a series of cams 38 which, through mechanism that includes cam followers 40 operate jaw opening wedges. The two cam followers 40 seen to the left in FIG. 1A are seen to operate through crank shafts 40' to actuate the jaw openers in the loading and unloading stations A and L.

The cams shown in FIG. 1A appear in end projection in FIG. 2, together with an end projection of the locating and jaw-opening mechanism for the stem blocks at the respective stations. As seen in FIG. 2, each cam follower 34 at each station, caused to oscillate by a constrained cam 32 on the common cam shaft 20, operates a segmental gear 34a which in turn oscillates pinions 36a (see also FIGS. 1A and 1B) on rock shaft 36 in bracket 35. A separate pinion 36b is fixed to the shaft 36 at each work station, and operates through a segmental gear 37 and link 36d to oscillate a lever 36e and a rock shaft 36' in the direction opposite rock shaft 36. Fixed to each of the common rock shafts 36 at both sides of the machine, as shown in FIG. 2, in a series of arms 36f, one for each work station, and also fixed to rock shafts 36' is a further series of arms 36g. Pivotally supported on shafts 36 and 36' are additional arms 36h and 36i, respectively. Arms 36f and 36h at the respective stations are urged apart by coil spring 36j, while arms 36g and 36i are urged apart by coil springs 36k. The several sets of arms 36f–36h, and 36g–36i are held together by bolts 36m. Accordingly, as the respective arms 36f are oscillated counter-clockwise (at the left of FIG. 2) by rock shaft 36, the associated arms 36h are yieldably carried along. Similarly, as arms 36g are oscillated clockwise (at the left of FIG. 2) by rock shaft 36', arms 36i are yieldably carried along. Arms 36h at the respective stations are seen to have lateral extensions engaging vertical slides 36n, each supporting a single pin 36o, while arms 36i are seen to have extensions engaging slides 36p each supporting a vertically reciprocating pair of pins 36q. These pins are shown also in FIG. 3. Each of the slides 36p carries a stop 36s engaging an adjustable screw stop 36r fixed in the machine frame so as to limit the upward stroke of the slide 36p.

The single pin 36o and the pair of pins 36q reciprocate oppositely, as a pair of jaws, for seizing the stem block 10 at times when the conveyor 12 brings successive stem blocks opposite these pins and for locking the stem block in place while the conveyor remains at rest. Pins 36q raise the stem block yieldably to a fixed limit. Pin 36o yieldably drives the stem block in the opposite direction.

As the cam followers 34 rock shafts 36 and 36' to oscillate the mechanisms described, springs 36j and 36k transmit the oscillatory thrust to the pin 36o and the pins 36q which seize each stem block. However, at each station, spring 36k is deliberately made substantially stronger than spring 36j and for this reason the upward stroke of the pin set 36q is more forceful than the downward stroke of pin 36o. Accordingly, the level at which each stem block 10 is finally positioned is determined by the adjustment of screw 36r. The downward stroke of pins 36o is adequate to grip the stem blocks, but not so forceful as to depress pins 36q.

The foregoing mechanism will be seen to be the mechanical analogue of the pneumatic conveyor-block gripping mechanism disclosed in my copending application, Serial No. 790,570 filed December 9, 1947.

FIG. 2 shows the constrained cams 38 and the cam followers 40 which were previously described for the purpose of operating the stem block jaws 10i, 10j for seizing and releasing the stems. Specifically, cam followers 40 are seen to have arms 40a for driving opposed slides 40b outwardly. These slides carry wedges 40c which engage the stem block jaws and periodically separate the jaws at times and in stations where necessary, as will be described in detail below. The stem block jaws are opened to receive a stem in the stem-loading station A and to release the completed stem in the stem-unloading station L. Additionally, the stem block jaws are quickly opened and closed in each of the two work stations immediately following the stem loading station, namely the lead trimming and swaging stations B and C. It will be understood that all of the cam shafts, drive shafts and slides described have bearings in frames 11 and 35, details of which need not be described.

The links of conveyor 12 carrying the stem blocks 10 are shown in detail in FIGS. 2 and 2A. Link 12a bearing a stem block 10 carries roller 12b and rollers 12d disposed respectively behind and in front of rail 12c. The rollers 12b and 12d cooperate with the rail 12c to guide the chain conveyor along an accurate path through the machine. A further fixed frame plate 12e overlies rearwardly projecting plates 12e' on links 12a for preventing the links from tipping. Each of the stem-block supporting links 12a has an outwardly projecting bracket 12f for the block 10. Rollers 12d cooperate with the sprockets, while each roller 12b is received between the sprocket arms.

The operation of the mechanism described to this point will be readily understood. Main drive shaft 20 rotates continuously to drive sprocket 14 intermittently 180° at a time. Sprocket 16 is driven by the chain conveyor, and supports and yieldably tensions the chain conveyor 12. Locking detent 26 is reciprocated in timed relationship to the indexing operation of sprocket 14 for arresting the conveyor in accurate indexed positions and for precluding movement of the drive sprocket 14 between indexing operations. Rock shafts 36 raise the respective single pins 36o and rock shafts 36' lower the respective sets of pins 36q for releasing the stem blocks 10 during indexing and operate reversely for gripping the blocks 10 when the chain conveyor 12 comes to rest. Adjustable stops 36r, with the effect of unequal springs 36k and 36j, determine the elevation of the stem block 10 when it is locked in position. At an appropriate time in the operating cycle of the machine, while the stem blocks 10 are gripped by cooperating pins 36o and 36q, cam followers 40 operate wedges 40c to open the stem-block jaws, the details of which are described below. The links 12a of the chain conveyor 12 which carry the stem blocks 10 are accurately guided along the path fixed by rail 12c and the cooperating rollers 12b, 12d.

The stem blocks 10, briefly described in connection with FIGS. 2 and 2A, are shown in greater detail in FIGS. 3, 4, and 5. Each stem block 10 is suspended on the outwardly extending brackets 12f of the supporting conveyor link 12a by pins 10a extending through enlarged bores in the brackets 12f, one pin appearing at each side of the stem block 10. Springs 10b surround pins 10a and bias the body 10c downward as limited by pins 10d. Body 10c is formed with respective channeled and conical recesses 10e providing bearing seats for the gripping pins 36o and 36q. Pin 36o, in its conical seat 10o, centers the block from left to right as viewed in FIG. 3. Body 10c has a central insert 10f constituting a seat for the glass header h, the insert 10f being formed with a passage 10g for receiving the projecting wires extending from header h. In addition, a pair of passages 10h on opposite sides of the insert 10f admit jaw opening wedges 40c when projected by the cam mechanism 40, 40a, and 40b previously described.

The body 10c slidably supports a pair of vertically movable jaws 10i and 10j, disposed in front of insert 10f for pressing header h against the insert and for gripping and centering the header h. A pair of plates 10k are fixed to the body 10c for slidably confining the jaws 10i and 10j. As seen in FIG. 5, each side of upper jaw 10i has a lateral extension 10m that lies behind a similar lateral extension 10n on lower jaw 10j.

The upper and lower jaws 10i and 10j are urged toward each other by a pair of inwardly spring biased wedges 10o each of which has a compression coil spring 10p. Wedges 10o coact with sloping faces 10n' of side notches in the lateral extensions 10n of the lower jaw 10j and with sloping faces 10m' of side notches in lateral extensions 10m of the upper jaw 19i.

Inward pressure by compression springs 10p forces wedges 10o to concurrently raise the lower jaw 10j and depress the upper jaw 10i, to firmly grip the header h. The jaws force the header h firmly against seat provided by the insert 10f by virtue of sloping header-engaging surfaces 10t of the jaws.

Jaws 10i and 10j have reversely sloping cam surfaces 10r and 10s (see FIG. 5) in their rear surfaces engaged by wedges 40c when it is necessary to open these jaws.

From the foregoing, it is seen that the stem blocks 10 are relatively loosely suspended from brackets 12f of the conveyor 12 and accordingly the conveyor 12 is only relied upon to transport the stem blocks 10 to successive positions to a first degree of accuracy. Thereafter, gripping and locating pins 36q and 36o accurately fix the location of the stem blocks 10 after the conveyor 12 has come to rest. Between those brief intervals when wedges separate jaws 10i and 10j, spring biased wedges 10o urge jaws 10i and 10j toward each other for resiliency gripping and centering the header h and for firmly seating the header. The headers are gripped at all times, both when the conveyor 12 is advancing and when it is at rest, except in the four stations A, B, C and L as previously mentioned. By virtue of the stem-block gripping mechanism, which accurately locates the stem-block 10 in each of the work stations, and the further header-gripping mechanism in the stem-block, the stem is successively positioned in the several work stations to a high degree of accuracy with front-to-rear and rotational orientation preserved continuously after it is once perfected.

Figure 11:
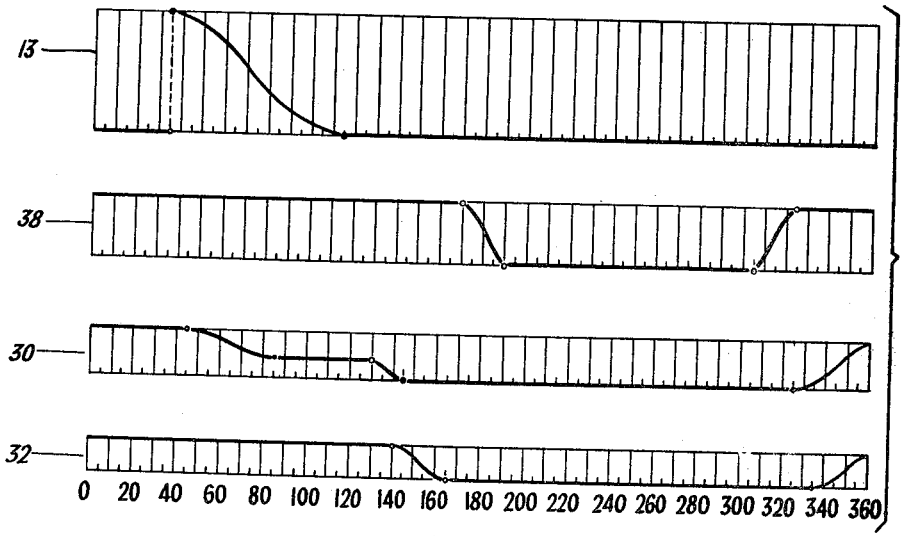
FIG. 11 is a timing chart of the conveyor and stem block operating mechanism shown in the preceding figures, wherein the time-motion curve is generally identified by the same numerals as are used for the cams producing such timed motions.

The timing of the drive and indexing mechanisms, utilized in the various stations to be described, is represented in FIG. 11. Sprocket 14 is intermittently advanced by any suitable continuous-to-intermittent drive means 13, illustrated in FIG. 11 to complete the conveyor advance in the interval 35° to 115°. Gradual acceleration and deceleration, together with rapid operation, is to be desired. Cam 30, which operates conveyor detent 26, advances the detent into the path of the next pin 24 after the pin previously released has been carried part way around with the sprocket. Firm locking of the sprocket by cam 30 and detent 26 is effected after conveyor drive has ceased.

Cams 32 operate the stem-block gripping pins 36o and 36q to seize and release the stem-block at the beginning of each cycle of operation of the tools on the stems in the respective stations, blocks 10 being locked in place as early as practicable and being released as late as practicable. This is indicated by the timing curve 32 in FIG. 11 corresponding to the drive effected by cam 32 in FIGS. 1A and 2.

Cams 38 operate wedges 40 to release the stems in stations B, C, and L, and to open the stem holders arriving in station A. Each station requires its own cam 38 and its own timing curve 38 represented, in FIG. 11, as will be appreciated when considering the various stations A, B, C and L specifically.

A feature of the invention represented by the mechanism in station A involves the location of a part in a preliminary orientation followed in later stations by successive refinements in the preliminary orientation. This assures reliable performance of the assembly machine despite inaccuracies or loose tolerances in the dimensions and in the distribution of the parts involved.

An important consideration in assembling the electrodes on the stem h having the series of wires 1 to 9 inclusive molded in a predetermined pattern involves the accommodation of stems in which the highly flexible wires are in a predetermined arbitrary pattern. The wires may not be distributed in a precise predetermined pattern, due to a certain degree of required looseness of the wires when received in passages in the molding dies where the stem was formed. Much more serious is the fact of random deformation of the comparatively long and slender wires incidental to handling. After loading of stems, the machine corrects wire deformity.

The details of station A are shown in FIGS. 6, 7, 8, 8A, 9, 10 and 10A, wherein there is illustrated mechanisms for initially loading a stem into the stem block 10 previously described. The loader not only inserts a stem into the stem block 10, but additionally predetermines the orientation of the wires 1 to 9 inclusive in relation to the stem block 10. There is no critical physical dimension which is utilized in the stem block 10 to predetermine the rotational orientation of the stem in the stem block, but instead, the stem loader itself is relied upon to insert the stem with particular wires in positions required for functioning of succeeding work station. Thus wires 6 and 7, considered as reference wires, are to be disposed one above the other in a vertical plane while the wires and the axis of the stem are horizontal. These conditions are obtained while the glass header is seated against the insert 10f in the stem block 10. Wire 7 is disposed above wire 6, and the remaining wires are distributed in the initial pattern determined by the glass molding operation. In station A, the stems are manually deposited on the blades of a feed plate turret, with no more than rough orientation required of the attendant. From this point, the mechanism performs automatically with progressively increasing precision in stem handling and in stem-wire "tailoring," including straightening, cutting, pattern-adjustment and swaging of the wires.

In FIG. 6 the general organization of the stem-loading station A is shown, the mechanism for operating certain parts being shown in FIG. 8. The stem loading mechanism includes a step-wise advanced carrier or turret 41, a set of transfer fingers 42, a pair of transfer arms 44 and 45, a split-funnel wire guide 46, and the necessary operating mechanisms coordinated as shown in the cam chart of FIG. 12. In FIG. 10A there is shown a holder 41a of the carrier 41 having a blade 41b extending between reference wires 6 and 7 arranged on one side, and wires 1, 2, and 3 on the other side. Blade 41b is approximately the maximum thickness permitted by the separation of these two groups of wires and so may be said to be tightly confined or "wedged" between them. Whether tight or loose, the stem rests on the edge of its blade and is prevented from tipping radially on the turret by the length of the blade engaged by the glass of the stem and is further prevented from tipping across the blade edge by the width of the blade engaged by the wires. Blade 41b penetrates the extending array of wires and serves to initially determine the rotational position about the stem axis in which the stem is ultimately loaded into the stem block 10.

The stems h are loaded manually or by appropriate automatic mechanisms onto the respective holders 41a, conveniently at the extreme left of turret 41 as seen in FIG. 6, and from this position the stems are indexed in the clock-wise direction, when looking down on the turret. As the turret 41 indexes, the stems are carried into a transfer position between transfer fingers 42 and the adjacent stem block 10 on the conveyor 12.

Turret 41 is supported on an upright shaft 41c journaled in a fixed bearing 41d. Supported on the lower face of turret 41 is a series of cam followers 41e which (see also FIG. 7) cooperate with a constrained barrel cam 41f having an integral medial rib 41g filling the space between two successive cam followers 41e. The rib 41g locks the turret 41 during part of the cam rotation. Additionally, barrel cam 41f has two curved runs 40h for producing the desired cam indexing motion. Barrel cam 41f rotates in a fixed bearing 41i (see FIG. 6) and is driven by a sprocket and chain drive including a sprocket 41j, a sprocket 41m, and a chain 41k trained over the sprockets. The sprocket 41m is on a secondary drive shaft 41n driven through bevel gearing from unit drive shaft 41p, the latter being coupled, as described above, to the main drive shaft of the machine. A suitable single-revolution electromagnet-controlled clutch 23a is interposed in the main drive shaft connection of this unit to the main drive of the whole machine, for control by appropriate manual or automatic devices, and a like clutch is included in the drive connection of each of the other units driven by shaft 20. Turret 41 carries a stem h into range of transfer fingers 42 for each revolution of the main drive 20.

The purpose of transfer fingers 42 is to shift the particular stem on a blade 41b on to an aligned blade 44a of the transfer arm 44. Transfer fingers 42, seen best in FIG. 8 (as viewed looking toward a stem block with turret 41 removed) are swingably supported on one end of a lever 42a having a central pivot 42b and a cam follower 42c on its opposite end. The lever 42a is biased by spring 42d against upstanding edge cam 42e on the shaft 41n.

When turret 41 has carried a stem to the transfer position in front of the horizontally extending transfer fingers 42, and when transfer arms 44, 45 are in their vertical position with the blade 44a aligned with the bearing against the blade 41b (FIG. 10A), the transfer fingers 42 are operated by cam 42e to displace the stem from the turret carrier 41a to the transfer arms 44, 45. The transfer fingers 42 follow the transfer arms 44, 45 arcuately toward the stem block 10 to provide the requisite support, but are quickly returned to the position shown in FIG. 6 prior to or during the next indexing of the turret 41. Accordingly, after the turret indexes one step, the next stem will be disposed in the transfer position in front of transfer fingers 42.

The transfer fingers 42 and their supporting lever 42a, cam follower 42c and operating cam 42e are shown best in FIG. 8 wherein there is illustrated an additional novel feature. A test or detecting finger 42f is carried on an insulating block 42g to move with transfer fingers 42. In the event that no stem is present on a carrier 41a for transfer operation to a particular stem block, then an electric circuit is conditioned appropriately to suppress operation of the further assembly mechanisms in succeeding stations which would otherwise operate on the stem carried by the particular stem block during the processing cycle. The suppression of operation of the further stations in respect to the empty stem block is effective in saving parts which cannot be assembled for lack of a stem in the stem block. Delayed control (S.N. 790,570) disables clutches 23a.

A split-funnel wire guide 46 and associated operating mechanism, shown partially in FIG. 6, are more completely illustrated in FIGS. 8 and 8A. The guide 46 includes two pivoted arms each having a funneled or flared portion 46c in the face 46a closest to the transfer arms 44, 45. Each arm has a smaller generally cylindrical portion 46c reaching face 46b (FIG. 6) facing stem block 10. The guide or funnel 46c is split and formed on the separate arms of the guide which swing reversely with pivoted pinions 46d and 46e. The pinion 46e is engaged by a segmental gear 46f, spring-biased to close the split funnel. Normally the funnel arms are spread apart to provide a clear passage between transfer arms 44, 45 and the stem block 10. Segmental gear 46f is positively driven downward through link 46g coupled to bell crank lever 46h. Bell crank lever 46h, pivoted intermediate its ends and rocked counter clockwise by link 46i, is coupled to a further bell crank lever 46j carrying cam follower 46k engaging edge cam 46m on the shaft 41p that is geared to shaft 41n. Spring 46q connected to bell crank 46j, biases the linkage between segmental gear 46f and the cam follower 46k in the reverse direction. Cam 46m opens split guide funnel 46 at all times except during actual insertion of the forwardly projecting wires into the hollow stem block insert 10f.

The transfer arms 44 and 45, which receive the stems from turret carrier 41a, are effective to swing the stems from a vertical stem-receiving position to a horizontal stem-inserting position, whereupon the stem wires are thrust endwise into the hollow insert 10f of the stem block 10, via split funnel 46. The transfer arms 44, 45, are shown greatly enlarged in FIG. 9, and their operating mechanisms appear in FIGS. 6 and 8. The transfer arm 44 has a pivot 43a journaled on a carriage 44b, the latter being horizontally slidable along a horizontal pair of guide rods 44c. The carriage 44b is biased by spring 44d toward the stem block 10, that is, in the direction of inserting a stem into the stem block 10. The carriage 44b is positively driven away from the stem block 10 by a lever 44e and cam follower 44f engaging cam 44g on shaft 41n. Lever 44e and cam follower 44f are interconnected by a long shaft 44h (FIG. 8) mounted for oscillation in fixed bearings.

As seen in FIG. 9 the transfer arm 44 has a rearward extension 44i which is capable of swinging clockwise under action of torsion spring 44j to engage a stop 44k on carriage 44b. The cooperating extension 44i and the stop 44k accurately arrest the transfer arm 44 in the horizontal stem-inserting position. The transfer arm 44 has a cam follower 44n bearing against stationary cam 44m. Arm 44 is raised from the horizontal when carriage 44 moves away from the stem block 10. When the transfer arm 44 and the integral cam follower 44n are carried with carriage 44b to the right and toward the stem block 10, transfer arm 44 is swung clockwise into horizontal stem-inserting position. This is shown in progressive stages in the first three diagrams of FIG. 10. It is seen that transfer fingers 42 push the header 41b or stem h from the turret 41 and its supporting blade 41b to the transfer arms 44, 45. In the first part of FIG. 10, fixed cam 44m engages rearwardly extending cam follower 44n to maintain transfer arm 44 in the vertical stem-receiving position.

As carriage 44b moves to the right in FIGS. 6 and 10, cam follower 44n gradually slides off the stationary cam and spring 44j urges the transfer arm 44 clockwise and into the horizontal stem-inserting position with extension 44i against abutment 44k.

Transfer arm 45 is carried by pivot 45a in transfer arm 44 and biased against transfer arm 44 by a torsion spring 45b, so that the two arms may move as a unit, horizontally and arcuately as shown in the first three phases of FIG. 10. Transfer arm 45 has an integral rearwardly extending cam follower 45c, whose function will be clear from the following.

The purpose of transfer arm 45 becomes apparent from the third and fourth views of FIG. 10 where the stem h is seen to extend horizontally. In the event that the transfer arm 45 were omitted, there would be considerable danger that, despite the frictional engagement of the wires with blade 44a, the stem still might shift or fall from the single transfer arm 44. By the time the extending wires on the stem h enter and pass through the split-guide funnel 46, the transfer arm 45 has served its intended purpose. As carriage 44b continues its horizontal travel to the right in FIG. 10 cam follower 45c, comes into engagement with a fixed cam 45d. The transfer arm 45 is thereby swung to an inoperative position of clearance, seen in the last diagram of FIG. 10. With the transfer arm 45 out of the way, the transfer arm 44 with its supported stem approaches the split guide funnel 46. After the funnel 46 has guided the leads into the stem block 10, the funnel, too, is removed and transfer arm 44 is effective to complete the insertion of the stem into stem block 10. Thereafter, jaws 10i, 10j of the stem block 10 are closed by proper coordination of the jaw-opening wedges 40c previously described. When the stem block jaws 10i, 10j have seized the glass header of the stem, carriage 44b slides horizontally to the left in FIGS. 6 and 10, thereby withdrawing the transfer arms 44, 45 from the projecting stem wires.

The wires extending through the insert 10f of the stem block 10 ultimately will constitute the external terminals of the completed electron tube, while the wires projecting from the front face of the stem block 10 will be variously processed and used in the assembly of the mount, as will appear.

In review, preliminary orientation of the stems to be located into stem block 10 is effected with the aid of blades 41b projecting radially from turret 40 during loading of the stems onto the holders 41a. By the cooperative effects of transfer fingers 42, transfer arm 44 with its transfer blade 44a, and transfer arm 45, this orientation is maintained as the stem is inserted into stem block 10. The leads that project from the face of the stem block 10 are thus disposed in the pattern required for operations at further stations. The glass header is pressed by stem block jaws 10i and 10j with their sloping edges against the seat provided by block insert 10f.

Figure 12:
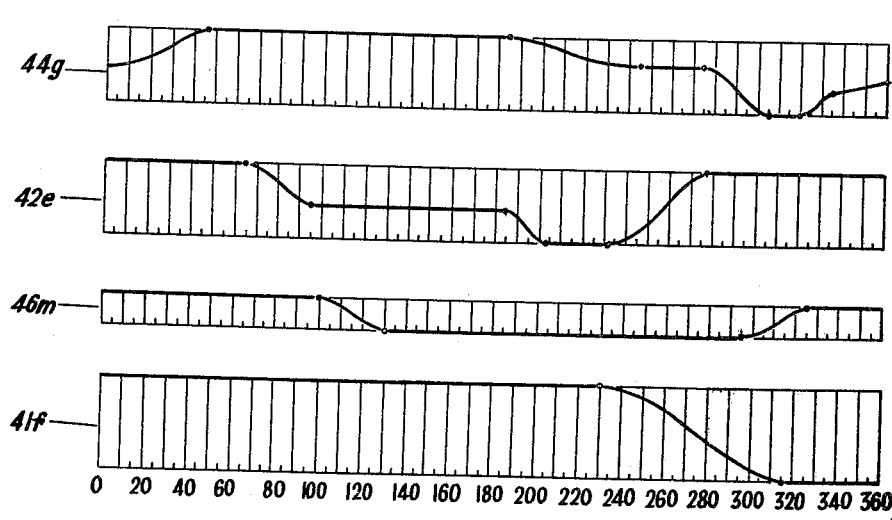
FIG. 12 is a timing chart of the mechanism in the stem loading station.

The timing of certain cam-operated mechanisms in station A is represented in FIG. 12. There it is seen that cam 44g operates carriage 44b carrying transfer arms 44, 45 to the left (FIG. 6) and to upright position near the start of the cycle. Thereafter transfer fingers 42 are advanced to bear against a stem and push it from plate 41 to arms 44 and 45. Split funnel 46m closes in front of a stem block that had just been carried to station A by the conveyor, as represented by the drop in curve 46m. Arms 44 and 45 start to travel toward the stem block near the 200 degree point in the cycle (curve 44g) and cam 42e continues to swing fingers 42 with arms 44 and 45 until those arms approach the horizontal. Carriage 44b advances arms 44 and 45 further toward the stem block while jaws 46 are closed, but near the end of travel of those arms jaws 46 open and the stem is seated in the stem block.

Cam 38 which operates the stem block jaws in station A should have a drop shortly after the conveyor comes to rest, and should have a rise while cam 44g has its dwell (305° to 320° in FIG. 12) so that the inserted stem is seized before arm 44 is withdrawn.

While one stem is being loaded into the stem block as described, arm 42 is swung to the extreme left by cam 42e, and feed plate indexing cam 41f advances the feed plate 41 one step to bring the next stem in front of fingers 42. Arms 44 and 45 then return in readiness for the next machine cycle.

The glass header may vary in diameter and in thickness, but the self-centering characteristics of the stem block jaws, and the sloping surfaces of the jaws that engage the glass are effective to accommodate wide variations in glass dimensions.

In order to more fully appreciate the mechanism illustrated herein, the operation at the various work stations will now be described; the specific elements of these stations are shown in detail in my Patent No. 3,069,749, of which the present application is a division.

The pattern of wires as oriented in station A where the stems are loaded into the stem block 10 is relatively critical in relation to the next operation at station B.

The stem loaded into the stem block 10 in the stem loading station A has wires projecting from the stem block, all approximately equal in length and longer than is needed in the final mount M. A group of these leads are to be trimmed to a short length to serve as an abutment or mechanical stop for supporting the bottom mica bm, and a further group of these leads are to be trimmed to an intermediate length for penetrating and extending a limited distance through the bottom mica bm.

The stem as loaded into the stem blocks 10 on the conveyer 12 is centered in the stem block jaws and held against the stem block insert as a seat; but the orientation of the pattern of wires rotationally is established only to a preliminary degree of accuracy in loading station A. Both the shortest leads and the intermediate length leads are sheared in the lead-trimming station B by a die block or fixed cutting member which serves a further important function, namely, to orient the stem in the stem block to a more precise degree of accuracy; and, as a still further function, to bend and adjust individual wires that might have been positioned inaccurately in the glass button by the previous stem-molding operation. In vacuum tube practice, wires may be in a "pin circle" or they may have a "random" pattern so as to occupy arbitrary positions in the glass header. The present stem has an arbitrary pattern of leads; but when the parts are to be automatically assembled, those leads should be in the predetermined pattern to a high degree of accuracy. The comparatively crude distribution of leads, as they reach the present machine, where they are formed with broad tolerance and further deformed in handling, is corrected in the present station, and further perfected in the next following station.

At the conclusion of the operations for accurate adjustment of the wires by bending where necessary, and shearing of the several wires to the required lengths, the cutting member is withdrawn. However, before this is done, jaws 10i and 10j of the stem block 10 again close on the glass button or header h and hold it against the seat provided by insert 10f.

A prominent feature of the lead-trimming station B is the combing action by which leads, extending a substantial distance away from the glass button at which the leads are relatively rigidly located, are carefully and precisely adjusted. This permits a tool to operate precisely on each of the wires even at a great distance from the stem block where, but for the combing action, it would be futile to expect the leads to be properly disposed. This principle will be noted in several of the work stations that follow. The combing action described is seen to include a closing-in of multiple coacting jaws forming a template through which the leads extend. These jaws close on the wires at a point immediately adjacent the stem block where the wires cannot have been greatly deformed in handling the stem, and thereafter the template or apertured pattern is drawn perpendicularly away from the stem block 10 to accurately locate the free ends of the plural wires in proper condition for further processing. This stroking action is utilized in several stations. In station B, it is effective for threading the wires into apertures provided in the die block for subsequent cutting, patterning and rotational adjustment of the stem. During the forward stroke of the die block toward the stem block 10, accurate lateral adjustment of the several wires is brought about by bending of the wires, the header being released for rotation of the header $h$ in the stem block. When the die block is close to the stem block 10, the jaws 10$i$, 10$j$ again grip the reoriented header.

The particular purpose of the mechanism in station C, of the illustrative mount machine, is to swage multiple leads to form shoulders S against which the bottom mica $bm$ may rest. These shoulders or abutments S, formed on medium length leads 1 and 4, cooperate with the short leads 2, 8 and 9 (defining the plane for the bottom mica $bm$) to assure further stability in the final mount. The swaged intermediate-length leads extend through the bottom mica $bm$ and afford projections to which the anode parts are assembled and welded, as will be seen.

In addition to this swaging operation, the pattern of leads is in the station C to facilitate the swaging. The pattern of leads and the rotational adjustment of the stem about its axis is adjusted as a further refinement of the progressive orientation by opening the stem block jaws 10$i$, 10$j$ while the combing tools are quite close to the stem block 10, and while the swaging tools are effective to form the shoulders S.

The opening of the stem block jaws at the precise time that the swaging tools engage the slender leads has a further important effect. If there is even slight misalignment between the swaging tools and the leads projecting from the glass button or base of the stem $h$, it is very possible that the leads being swaged might be broken or sheared off, or the glass button might be cracked. However, since the jaws of the stem block are released during the swaging tools affect the leads alone and do not tend to tear the leads away from the glass button.

During the swaging operation the header engaging jaws of the stem block 10 spread so that the stem on which the work is performed is carried not by the conveyor but by the tools in the work station. This principle is used in the preceding lead-trimming station; and in somewhat modified form it is applied in the stations where the bottom mica and the grids are applied, as will be seen.

Immediately after the swaging tools open, the stem block jaws close, and the swaging and gathering tools are retracted to clear the way for the swaged stem to advance and for the next stem to enter the station.

The fourth station D uses part of this same principle of adjusting the position of the work carried by the workholder to a very high degree of accuracy in the work station, just as the wires are severally located for cutting and swaging in the second and third stations. In the bottom mica-applying station D, the stem $h$ is to receive a pierced mica disc $bm$, assembled on the stem by disposing ends of the stem wires opposite holes in the mica, and advancing the mica with its flat side facing the stem block. For a special reason, which will subsequently become apparent, the mica is not to be forced very close to the glass button. The glass button remains gripped by the stem block 10 in the mica-assembling station D.

The wires to be threaded through pierced holes in the mica were combed and straightened in the preceding cutting and swaging stations, but they do not project in the precise positions required by the mica-applying tools.

The devices in the bottom mica station take the mica-receiving wires in hand and locate the wires very accurately to allow proper assembly of the pierced mica. This "taking in hand" of the critical part of the workpiece to accurately locate the same without depending on extreme precision as to its location in the work carrier, is a significant feature in this station as well as in other stations of the machine.

A further very important feature of the mica-assembling station D is the concept of piercing the mica in the very support that carries the pierced mica to the stem wires. By piercing the mica in the applying mechanism, the assurance is inherently realized that the holes will be in the proper positions for application to the supporting wires. It would be a most severe undertaking to locate micas with the required accuracy were the micas pierced previously in a separate machine, considering the tiny mount here of concern. It should be recalled that the high degree of accuracy required by the tiny parts being handled is a controlling consideration in this embodiment. Accordingly, the concept of piercing the part in the very holder which assembles the pierced part is most valuable; it eliminates need for any preliminary orientation of the work prior to loading into the assembly machine and the incident risk of misalignment.

Adjacent the bottom mica mechanism it is convenient to include a further useful tool. It sometimes happens that the short wires are disposed in convenient positions in stations B and C, near but not in required position. They are here bent again so that the side rods of the grids that are later to be assembled will not butt against the ends of the short wires. Thus, clearance-providing tools are effectively provided to position the short length wires 2, 8 and 9 for unimpeded assembly of the grids in the following stations. There is a possibility that short length wires 2, 8 and 9 defining the abutment for the bottom mica $bm$ may interfere with the grid side rods to be projected through the bottom mica. These wires should be close to the side rods of the grids, since the wires are ultimately to be welded to the side rods for terminal leads for those electrodes. However, they may occasionally interfere with the mechanical assembly, a difficulty cured by the clearance tools.

Referring to FIG. 1B, station E is shown as adding the No. 1 grid to the bottom mica $bm$ previously assembled to the stem or incomplete mount. Not only is the grid $g1$ assembled to the mica, but also a short strap or grid stop $gs$ is secured to a grid side rod. This stop is tight against the back or under face of the bottom mica, which mica is confined between this grid stop on one surface and the last helical turn wound around and secured to the grid side rods. These grid side rods project through holes pierced in the bottom mica.

In order to attach the grid stop $gs$ to the side rods, the grid stop is welded in place to one of the side rods after both of the side rods have penetrated appropriate holes in the bottom mica $bm$. By pushing the mica to an intermediate position in station D, only part way along the stem wires 6 and 7, space is provided in station E for the tools that assemble and weld the grid stop to the grid side rod. A substantial distance is allowed between the intermediate position of the bottom mica $bm$ and the projecting ends of wires 1, 3, 4 and 5, and a still greater distance is allowed between the bottom mica $bm$ and the free ends of the shortest leads 2, 8 and 9. The swaged portions of the intermediate leads 1 and 4 and the short leads 2, 8 and 9 define a datum plane where the bottom mica $bm$ is seated ultimately.

From the following discussion of the No. 1 grid station E, various principles will be recognized as having application here which were previously described in connection with preceding stations. It is clear that every effort is made to locate the stem block 10 accurately in each work station. However, because of various dimensional tolerances and imperfections in adjustment of the stem block 10 in relation to the tools in the station, and further where very fine, tightly fitting parts are used, something additional is desirable for assuring routine success. Tools in this station take hold of certain wires projecting from the stem, similar to combing tools in work stations B, C, and D where cutting, swaging, and mica-loading were involved and where the work to be processed is "picked up" and oriented in respect to the working tools at each station. Additionally, the orienting operation effected by sliding the tools along the stem wires is an operation common to various stations. This operation might be termed "combing" in contrast to operation of the V-notched tools, which, in gripping, merely gather the gripped leads.

Devices of station E deal with individually supplying grids to a grid inserter and with preparing and precisely positioning a grid stop that is to be applied to a side rod of a grid projecting through a mica. There remains to be explained the manner of directing the grid side rods toward the holes provided for them in the mica. This is achieved by a series of operations, in which the mica is shifted transversely and rotationally in any degree required, by picking up the long #6 and #7 wires that carry the mica, and fixing a pattern for the grid side rods and the #6 and #7 wires that matches the pattern of holes in the mica. While it is the mica whose location is critical, the mica is indirectly controlled, by handling the long wires penetrating the mica. The tools that achieve the double results of picking up the #6 and #7 wires (and with them, the mica) and establishing a pattern for the side rods and the long stem wires matching the mica perforations have passages with reverse flares directed respectively toward and away from the stem block, that is, toward the ends of the long stem wires and the grid rods, respectively, with the tools interposed between those parts. These tools operate to gather the several wires, and in their travel along the stem wires, act in a broad sense as combining the gathering tools. The remarkable effectiveness of the whole operation will be appreciated from a realization of the extreme precision required by the small dimensions of the parts. The wires and the side rods might buckle, and the ¼ inch diameter mica might be damaged, if the pattern of the wires and rods as well as the pattern and orientation of the mica holes in relation to the wires are not correct within a thousandth of an inch, recalling that the side rods have a tight fit in their holes through the mica.

The gathering tools for the stem wires and the grid side rods include a pair of jaws which have a complex motion for their multiple functions. These jaws close on each other and advance toward the stem to receive and "take in hand" the uncut reference wires 6 and 7 projecting from the stem. In the closed position, the jaws form a two-part guide passage through which the grid inserter thrusts the grid toward the bottom mica bm. The jaws may also serve to press the bottom mica toward the welding tools. After a No. 1 grid has been inserted into a bottom mica of a mount M, the jaws withdraw.

The stem arrives at station F bearing the bottom mica supported near the free ends of wires 6 and 7, the mica in turn carrying the #1 grid with its grid stop welded in place. At the #2 grid station, the second and last electrode is assembled, that is to have portions extending through the bottom mica. Subsequently the four medium-length leads 1, 3, 4 and 5 of the stem extend through this mica, but of the electrodes added to the stem, the #2 grid is the last to have parts pushed through the bottom mica. In this station F, the mica is "backed up," as was also the case in station E, while spaced away from stem leads 1, 3, 4 and 5; and after the side rods of grid g2 are driven through the bottom mica, that mica and the electrodes carried thereby are shifted along long wires 6 and 7 into their final positions. Bottom mica bm then rests against the ends of short stem wires 2, 8 and 9 and against the shoulders swaged at the same plane on wires 1 and 4; and the medium length leads 1, 3, 4 and 5 extend through the bottom mica. This result follows not solely from the transport of the bottom mica, but from the combined combing and pattern-adjusting operations effected in stations B and C, and the related pattern of holes pierced through the bottom mica in station D.

The mechanism for inserting the #2 grid is seen in FIG. 1B at station F. This station uses certain principles and certain mechanisms covered in my previously filed application Serial No. 790,570, filed December 9, 1947. This station utilizes duplicated or essentially duplicated mechanisms as those used for the No. 1 grid station E. It is the function of the combing tools similar to tools in stations B and C, to align the various medium-length wires with the utmost precision. These leads enter the pattern of holes in the bottom mica bm as other tools drive the mica toward the glass button of the stem until the bottom mica bm is properly seated in the datum plane of the shoulders S and short wires 2, 8 and 9.

It is necessary in the course of the operation of assembling the #2 grid to carefully adjust the position of the #1 grid and the uncut reference wires 6 and 7 previously on the stem in order that the parts may not be deformed.

Stem wire gathering tools engage the intermediate length stem leads. These tools are effective to close in upon and accurately locate six of the nine wires projecting from the mount M at the #2 grid station F. The other three wires, namely 2, 8 and 9 were previously shortened in the lead trimming station B. In addition, the gathering tools are formed with a through passage for receiving the #1 grid g1 and the grid stop gs secured to one side rode of the #1 grid g1 after the gathering tools have been brought forward along the uncut reference wires 6 and 7.

In FIG. 1B opposite station F, the mount is shown complete to the extent of having the bottom mica bm and the first two grids g1, g2. In this condition, the conveyer 12 advances the stem block 10 carrying such incomplete mount around sprocket 16 to stations G and H where two halves a of a two-part anode are applied in succession to respective pairs of wires 3, 4 and 1, 5 that project through the bottom mica. By means of an automatic feeder and appropriate welding mechanism, not shown, a getter is spot-welded to the anode part a shown at the top of the mount at station G. In this condition the anode half a is ready for assembly to the stem by a mechanism which is substantially duplicated at station H for applying the second anode part a to the stem.

Mechanisms are provided for assembling one part of the two-part anode to the amount after it emerges from the second grid-assembly station F and enters anode assembling station G. The other anode assembling station H is similar in all respects except that the anode part is applied in inverted condition, and the stem-and-anode-engaging tools are appropriately inverted.

Referring now to FIG. 1B, the mount is completed to the extent of having both the first and second grid g1, g2, as well as both parts a of the two-part anode when it arrives at station I. The grids are supported by their side rods which penetrate the bottom mica bm and the anode parts are supported by the medium-length wire pairs 1, 5 and 3, 4 which likewise penetrate the bottom mica. At station I, the top mica tm is to be pierced and then applied to the projecting side rods of the grids g1, g2 and to the long stem wires 6 and 7 which extend from the glass header h. Many of the same principles and virtually the same mica handling mechanisms are used in station I for piercing the top mica tm and applying it to the wires projecting from the stem as are used in connection with station D for forming and applying the bottom mica bm to the same wires. In station I, however, the top mica is also to be applied to the grids, penetrated by the grid side rods. The top mica is pierced in station I; the ends of wires #6 and #7 and of the grid side rods are adjusted into the pattern corresponding to the pierced holes; and finally the top mica is applied to those wires and rods. The anode parts $a$ do not penetrate the top mica, but serve as the limiting reference plane to which the top mica is pushed when it is applied.

Referring now to FIG. 1A, it is seen that the stem arrives in station J bearing the bottom mica, the Nos. 1 and 2 grids, the two parts of the anode, and the top mica. The mount M is almost fully assembled except that the upper ends of the anode parts $a$ against the top mica $tm$ are not rigidly held in position and are not interconnected as a single bi-part anode. The lower ends of anode parts are only frictionally held in position adjacent to the bottom mica $bm$ by the intermediate-length wires 1, 3, 4 and 5. The top mica is only held frictionally on the side rods of the grids and on the long wires 6 and 7.

At station J, a connector $c$ is inserted through the top mica $tm$ and into the tubular passages at one end of each anode part or plate to provide the required mechanical and electrical interconnection. This connector $c$ is a bridging wire or "hairpin" which fixes the anode parts accurately at the positions where the connector $c$ penetrates the accurately pierced top mica. This connector serves the further purpose of holding the top mica $tm$ against the ends of the anode plates and in position to maintain the accurate configuration of the electrodes. Additionally at station J the anode is welded to one or more of the medium-length stem wires and to be inserted "hairpin" for uniting the assembly permanently, and for forming the desired electrical joints. At station K, a second connector $c$ is inserted, being a mirror-image duplicate of the bridging connector at station J, and the like welds are made.

The mechanism which inserts the connector $c$ is also designed to form the connector, this feature being important in that it eliminates the potentially severe problem of orienting and handling these tiny odd-shaped parts. (The connectors might otherwise be furnished as finished parts.) The connector material is supplied to the machine as a continuous wire which is formed into the required part and, while the newly-formed part is continuously gripped and is held in the desired orientation, this part is applied to the mount in the required position. A similar concept is involved in the No. 1 grid station wherein each grid stop is formed in the machine as needed and is at all times held until it is assembled in place on the stem.

At this station, the connector $c$ is formed and forced through the holes in the top mica pierced in accurate positions, with the intermediate, offset connecting bight pressed against the top mica $tm$ and with the legs driven into respective sleeves of the two anode parts. Accordingly, the ends of the anode parts nearest the top mica $tm$ are fixed in accurate spaced positions relative to the other electrodes previously mounted between the anode parts, fixed in proper precise positions by projections through the top mica.

In addition to the forming and assembling of connector $c$ in place as shown, the legs of the connector $c$ are spot welded to the anode parts at points $a'$, and stem wires 1 and 4 are spot welded to parts $a$ at adjacent points. This series of welding operations as described is susceptible to modification, since the anode-to-stem-wire welds may alternatively be accomplished in the anode assembly stations; and certain welding operations may be deferred until after the assembled mount M has been delivered from the machine, welded in the machine at only the few spots that will reliably unite the mount mechanically. It may be desirable to reduce the number of welds effected in the assembling apparatus because wear of the welding electrodes requires more frequent shut-downs for adjustment when a large number of welds is to be made than for few welds.

An important aspect of this station, similarly found in the No. 1 grid station, is the manner of orienting the top mica for receiving the legs of the anode connector $c$, this orientation being accomplished by tools that act by camming long stem wires 6 and 7 into place which carry the top mica into the precise required location and with its holes in the critical required positions.

When the stem block reaches station L, the mount is complete, very nearly in the form delivered by the assembling machine. It is a rigid unit, with the electrodes, the micas and the stem accurately and permanently united. Several operations must still be done before this mount can be enclosed in its envelope, namely the grids are to be joined to stem wires and a cathode is to be inserted and connected in place. With other forms of electrode and mounts, the concepts in the foregoing disclosure can readily be adapted to fabricate a technically complete mount. In the present machine, the long wires #6 and #7 are to be cut shorter, and the mount is to be withdrawn from the stem block. The stem wires #6 and #7 were deliberately made longer than required in the finished stem, for their functional contribution in the assembling process. In station L, a mechanical pair of cutters trims those wires, and a pair of jaws appropriately formed are provided to grip and withdraw the mount from stem block 10. As seen in FIGS. 1A, 2 and 5 one of the cam-operated stem block mechanisms 38, 40 previously described releases the mount for unloading. In the event of misoperation resulting in a mount remaining in a stem block after leaving station L, an operator can still clear the stem block during the next machine cycle and before the stem block enters the loading station A.

The mechanism of station L is not separately illustrated and described in detail because its nature will be clear from the foregoing description to those skilled in the art.

The various features of the invention are believed amply shown and described, to the extent that recapitulation might serve to confuse rather than to clarify. It should be noted that the total result of the operation of the properly adjusted apparatus is represented in the integral mount delivered which is of such excellence that rejection of a finished tube because of an electrode assembly defect is rare. This is a prominent advantage of the mechanically assembled mount over a manually assembled product.

The organized apparatus may be modified in innumerable respects. For example, the conveyor 12, while of unique construction adapted to the machine disclosed, might be dispensed with entirely in an evasive effort, and in its place manual attendants might physically move stem blocks 10 from each assembly unit to the next. Furthermore, in assembling like products of modified designs, portions of the assembling apparatus and method may be omitted or adapted to meet requirements. Consequently the appended claims should be broadly construed, consistent with the spirit and scope of the invention.

What I claim is:

1. The combination with a mount machine including at least one conveyor-supported stem block having a passage to receive a stem having leads molded in a header with leads extending in opposite directions from said header, said stem block including a hollow insert for the extension therein of the leads extending in one direction, of a loading station including an intermittently indexed carrier, at least one stem holder on said carrier including a blade movable into a transfer position relative to said stem block, said holder carrying a stem having the leads extending in the other direction parted and oriented about said blade, means including a transfer blade alignable with the holder blade for receiving a stem from said holder and for inserting said stem into said stem block with stem leads extending into said insert, and transfer means movable from said holder blade toward said transfer blade for displacing the stem from said holder blade to said transfer blade while retaining the initial lead orientation.

2. In a multiple-station mount machine including a stem block loaded at a station with a stem having leads projecting from opposite sides of a molded header, said stem block being arranged to receive the leads extending from one side of the header and to support said stem with the other leads projecting from the other side of the header for successive operations at further stations, said station including a movable carrier, a stem holder on said carrier having an orienting blade parting said other lead group and movable into a transfer position relative to said stem block, a transfer mechanism interposed between said stem block and carrier and having a transfer blade receiving the stem on said orienting blade in said transfer position, means operative to move said transfer mechanism through an operational cycle from a stem receiving position relative to said holder to a stem-inserting position relative to said stem block, and transfer means operable when said holder is in said transfer position with said transfer mechanism in said stem-receiving position for moving the stem from said orienting blade onto said transfer blade.

3. In a mount machine having a stem block formed to receive a horizontally extending molded stem having a header and leads projecting in one direction accommodated within the stem block and leads projecting in the opposite direction from said stem block, a loading station for inserting a molded stem into said stem block, said loading station including a stepwise carrier including a stem holder having a horizontal-edged blade disposed in a vertical plane for parting said further lead group and initially orienting an upright stem relative to said stem block, a cradled support including a transfer blade, operating mechanism moving said support from a vertical stem-receiving position, wherein said transfer blade is aligned with the holder blade, along an arcuate path to a thrust position wherein said support is horizontal and with the stem aligned with said stem block, said operating mechanism being further effective to move said support along a linear path toward said stem block for inserting the supported stem in oriented position into said stem block, transfer means mounted to traverse said holder blade for displacing the stem thereon onto said transfer blade, and coordinating means operable to shift said transfer means into initial positions for stem displacement prior to the arrival of the stem holder in stem transfer position.

4. In a mount machine including a conveyor-supported stem block adapted to receive a stem having first and second projecting leads extending in opposite directions from a header in an arbitrary pattern, a loading station comprising an intermittently indexed carrier having a holder movable into a transfer position relative to said stem block, and transfer means operable to remove said stem from said holder and for inserting same into said stem block, said transfer means including a support movable from a stem-receiving position with the support in alignment with said holder into a stem-inserting position relative to said stem block, plurally electrically conductive transfer fingers adjacent said holder in said transfer position and operable to displace the stem therein from said holder onto the support, and operating means for moving said support into said stem-inserting position.

5. In a multiple-station machine including a movable stem block adapted to receive a stem having leads extending in opposite directions from a header in an arbitrary pattern, a loading station followed by further work stations, a carrier having a holder movable into a transfer position relative to said stem block, a parting member on said holder for initially orienting leads of said stem, transfer means operable to remove said stem from said holder and for inserting same into said stem block, said transfer means including a support movable from a stem-receiving position relative to said holder into a stem-inserting position relative to said stem block, and plural electrically conductive transfer fingers adjacent said holder in said transfer position and operable to displace the stem therein from the holder onto the transfer support, means for insulating one of said transfer fingers from the remaining transfer fingers which thereby serve as a detector for the wires of a stem in said holder.

6. In a multiple-station mount machine including a stem block loaded at a station with a stem having leads projecting in sets from opposite sides of a molded header, said stem block having a passage to receive one set of leads and to support said stem with the other set of leads projecting outwardly therefrom for successive operations at further stations, said station including a movable carrier, a stem holder on said carrier having an orienting blade parting said other set of leads and movable into a transfer position relative to said stem block, transfer means interposed between said stem block and carrier and including two parts pivotally connected together and disposed to engage said sets of leads at opposite sides of the stem header, one of said parts having a transfer blade receiving said other set of leads of said stem from said orienting blade in said transfer position and with said transfer blade engaging the header of said stem, means for biasing the other of said parts into a supporting position for said one set of leads, means operative to move said transfer means through an operational cycle from a stem receiving position relative to said holder and along a linear thrust path to a stem-inserting position relative to said stem block with said transfer blade disposed behind and pushing such header, guide means along said linear thrust path directing said one set of leads toward a bore in said stem block, means operable when said holder is in said transfer position with said transfer means in said stem-receiving position for moving the stem from said orienting blade onto said transfer blade, and further means operable when the leading ends of said one lead group are received within said guide means for pivoting said other part from supporting engagement with the leads extending from one side of the header said supporting position and away from said linear thrust path.

7. A stem handling mechanism including a horizontally reciprocable carrier, a first cradle pivotally carried thereby, a second cradle pivotally carried by the first cradle, means biasing said cradles into upright position, and coordinating mechanism for concurrently shifting said carrier along a horizontal stroke and swinging both said cradles together into horizontal position during said stroke, said coordinating mechanism additionally including means for swinging said second cradle to a position of clearance near the end of said stroke of said carrier.

8. The combination with a mount machine including at least one conveyor-supported stem block adapted to receive a stem having leads molded in a header with projecting sets of leads extending in opposite directions from said header, said stem block including a bore for the extension therethrough of one lead group, of a loading station including an intermittently indexed carrier, at least one stem holder on said carrier including a blade and being movable into a transfer position relative to said stem block, said holder carrying a stem having the other set of leads parted and oriented by said blade and with said header engaged by a horizontal edge of said blade, a main support having a transfer blade alignable with the holder blade for receiving a stem from said holder, means for moving said main support to carry said stem along a thrust path into a supported position in said stem block, an auxiliary support movable with said main support for temporarily cradling said one set of leads during movement along said thrust path, separable guide jaws arranged along said thrust path for directing said one lead group toward said insert, respective operating means for said auxiliary support and said guide jaws coordinated to displace said auxiliary support from said thrust path when said one set of leads enters said guide jaws and for thereafter separating said guide jaws, permitting unimpeded advance of said main support toward said stem block, and means for displacing the stem from said holder blade to said transfer blade.

9. In a mount machine including a conveyor-supported stem block adapted to receive a stem having leads extending in opposite directions from a header in arbitrary patterns, in predetermined orientation, a loading station comprising an intermittently indexed carrier having a holder movable into a transfer position relative to said stem block, a first blade on said holder for parting and initially orienting the leads of said stem extending in one direction when supported in said holder, and means operable to remove said stem from said holder and for inserting same into said stem block, said means including a supporting structure movable from a stem-receiving position relative to said holder into a stem-inserting position relative to said stem block, a second blade on said supporting structure aligned with said first blade when in said stem-receiving position, transfer means adjacent said holder in said transfer position and operable to displace the stem therein from said first blade, and operating means for moving said supporting structure into said stem-inserting position.

10. A mount machine according to claim 9, wherein said supporting structure includes a first pivoted transfer arm carrying said second blade, engaging leads extending in one direction from said header and providing a rest for said header, a second pivoted transfer arm biased against said first transfer arm and arranged to provide a temporary support for the leads of said stem extending in the other direction from said header, and means operable as said supporting structure approaches said stem inserting position for pivoting said second transfer arm away from said first transfer arm to permit unimpeded insertion of the unsupported leads into said stem block.

11. In an assembling machine, an intermittent conveyor for stems having a header and multiple projecting wires, multiple stem blocks carried by said conveyor, self-centering jaws in said blocks engageable with the header of a stem so as to support a stem with its wires projecting freely, jaw-operating means enageable with the stem block jaws effective in multiple conveyor stations to open the jaws variously for receiving, unloading and releasing a stem, locating means engageable with the stem wires adjacent the header of a temporarily released stem in a stem block, locating tools cooperable with the free ends of the stem wires in further conveyor stations, and assembling components to said stem while said stem wires are held by said locating toools.

References Cited by the Examiner
UNITED STATES PATENTS

| | | |
|---|---|---|
| 1,547,146 | 7/25 | Peiler. |
| 1,783,642 | 12/30 | Ferguson. |
| 2,405,018 | 7/46 | Crowley. |
| 2,881,646 | 4/59 | Farr ------------------ 78—1 |
| 2,980,266 | 4/61 | Boros. |
| 3,034,663 | 5/62 | Crosby. |
| 3,071,166 | 1/63 | Gutbier ---------------- 78—1 X |
| 3,094,887 | 6/63 | Zwald ------------------ 78—1 |

HUGO O. SCHULZ, *Primary Examiner*.

ROBERT H. EANES, JR., MARVIN A. CHAMPION,
*Examiners.*